United States Patent
Watanabe et al.

(10) Patent No.: US 10,150,086 B2
(45) Date of Patent: Dec. 11, 2018

(54) METHOD FOR PRODUCING A CARBON HOLLOW FIBER MEMBRANE

(71) Applicant: NOK Corporation, Tokyo (JP)

(72) Inventors: Kensuke Watanabe, Shizuoka (JP); Hirokazu Yamamoto, Shizuoka (JP)

(73) Assignee: NOK Corporation, Tokyo (JP)

( * ) Notice: Subject to any disclaimer, the term of this patent is extended or adjusted under 35 U.S.C. 154(b) by 0 days.

(21) Appl. No.: 15/535,256

(22) PCT Filed: Dec. 11, 2015

(86) PCT No.: PCT/JP2015/084851
§ 371 (c)(1),
(2) Date: Jun. 12, 2017

(87) PCT Pub. No.: WO2016/093357
PCT Pub. Date: Jun. 16, 2016

(65) Prior Publication Data
US 2017/0320020 A1    Nov. 9, 2017

(30) Foreign Application Priority Data
Dec. 12, 2014   (JP) ................................. 2014-252126

(51) Int. Cl.
*B01D 53/22*   (2006.01)
*B01D 69/08*   (2006.01)
(Continued)

(52) U.S. Cl.
CPC ....... *B01D 69/087* (2013.01); *B01D 67/0067* (2013.01); *B01D 67/0088* (2013.01);
(Continued)

(58) Field of Classification Search
CPC .. B01D 69/08; B01D 67/0088; B01D 69/087; B01D 67/0067; B01D 71/021;
(Continued)

(56) References Cited

U.S. PATENT DOCUMENTS 3,735,559 A  * 5/1973 Salemme ............. B01D 53/268
                                                261/104
4,198,459 A  * 4/1980 Brumlik ................. D01D 11/00
                                                 28/220
(Continued)

FOREIGN PATENT DOCUMENTS

EP      0617997 A1    10/1994
JP      7-51551       2/1995
(Continued)

OTHER PUBLICATIONS

International Preliminary Report on Patentability and Written Opinion from corresponding PCT application No. PCT/JP2015/084851 dated Jun. 13, 2017 (7 pgs).
(Continued)

*Primary Examiner* — Anthony R Shumate
(74) *Attorney, Agent, or Firm* — Brinks Gilson & Lione

(57) ABSTRACT

A hollow fiber carbon membrane is produced by preparing a membrane-forming dope for carbon membranes by dissolving polyphenylene oxide in an amount giving a concentration of 15 to 40 wt. % in the membrane-forming dope, and sulfur in an amount giving a ratio of 0.2 to 3.0 wt. % based on the polyphenylene oxide, in a solvent capable of dissolving these components; preparing the membrane-forming dope for carbon membranes into a hollow shape by means of a spinning method in accordance with a non-solvent induced separation method using a double annular nozzle; performing a crosslinking treatment at 200 to 240° C. in the air; then performing an infusibilization treatment by heating at 250 to 350° C.; and further performing a carbonization treatment by heating at 450 to 850° C. in an inert atmosphere or under vacuum.

4 Claims, 1 Drawing Sheet

(51) Int. Cl.
*D01F 9/24* (2006.01)
*B01D 67/00* (2006.01)
*B01D 71/02* (2006.01)
*B05D 1/00* (2006.01)
*D01D 1/02* (2006.01)
*D01D 5/24* (2006.01)
*D01D 10/02* (2006.01)
*B01D 69/14* (2006.01)

(52) U.S. Cl.
CPC ............ *B01D 69/08* (2013.01); *B01D 69/141* (2013.01); *B01D 71/021* (2013.01); *B05D 1/60* (2013.01); *D01D 1/02* (2013.01); *D01D 5/24* (2013.01); *D01D 10/02* (2013.01); *D01F 9/24* (2013.01); *D10B 2505/04* (2013.01)

(58) Field of Classification Search
CPC .......... B01D 69/141; D01F 9/24; D01D 1/02; D01D 10/02; D01D 5/24; D10B 2505/04; B05D 1/60
See application file for complete search history.

(56) References Cited

U.S. PATENT DOCUMENTS

| | | | | |
|---|---|---|---|---|
| 4,851,100 | A * | 7/1989 | Hodgdon | C08J 5/2275 204/296 |
| 5,348,569 | A * | 9/1994 | Bikson | B01D 53/228 95/45 |
| 5,356,459 | A * | 10/1994 | Bikson | B01D 53/22 55/524 |
| 5,695,818 | A | 12/1997 | Soffer et al. | |
| 5,989,742 | A * | 11/1999 | Cabasso | B01D 71/52 429/493 |
| 6,103,414 | A * | 8/2000 | Cabasso | B01D 71/52 429/309 |
| 6,248,469 | B1 * | 6/2001 | Formato | B01D 67/0088 429/300 |
| 2002/0061431 | A1 * | 5/2002 | Koyama | C08J 5/2256 429/481 |
| 2006/0121217 | A1 * | 6/2006 | Childs | B01D 67/0088 428/34.1 |
| 2009/0176052 | A1 * | 7/2009 | Childs | B01D 67/0009 428/101 |
| 2010/0212503 | A1 * | 8/2010 | Yoshimune | B01D 53/22 96/10 |
| 2018/0078907 | A1 * | 3/2018 | Yoshimune | B01D 63/02 |

FOREIGN PATENT DOCUMENTS

| | | |
|---|---|---|
| JP | 2000-185212 | 7/2000 |
| JP | 2009-34614 A | 2/2009 |
| JP | 2013-063415 | 4/2013 |
| JP | 2013-071073 | 4/2013 |
| JP | 2013-094744 | 5/2013 |

OTHER PUBLICATIONS

International Search Report from corresponding PCT application No. PCT/JP2015/084851 dated Jan. 26, 2016 (4 pgs).

Yoshimune, Miki et al., "Development of novel carbon hollow fiber membranes and their application to membrane separation processes", *National Institute of Advanced Industrial Science And Technology (AIST)*, Nanofiber, Dec. 25, 2012, vol. 3 No. 1, p. 18-21 (first page only).

Yingqian, Ren et al., "Solubility of elemental sulfur in pure organic solvents and organic solventionic liquid mixtures from 293.15 to 353.15K", *Fluid Phase Equilibria Elsevier*, Amsterdam NL, 312, 2011 (pp. 31-36).

Yoshimune, M. et al., "Flexible carbon hollow fiber membranes derived from sulfonated poly(phenylene oxide)", *Separation and Purification Technology, Elsevier Science*, Amsterdam, NL, vol. 75, No. 2, Oct. 13, 2010 (pp. 193-197) XP027322843; ISSN: 1383-5866.

* cited by examiner

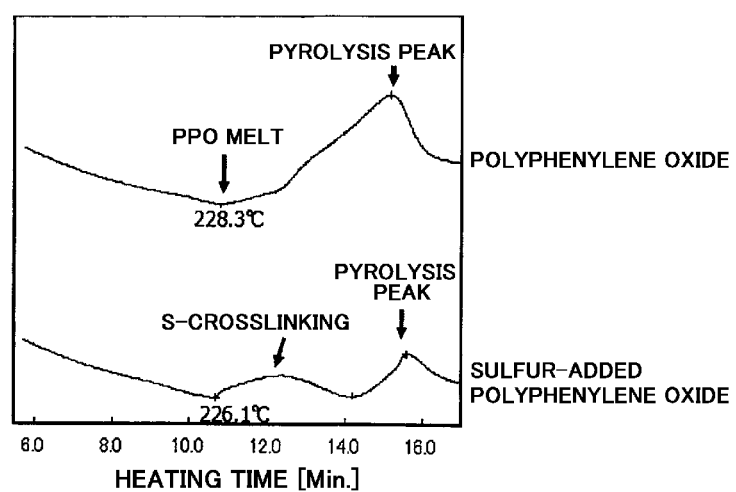

METHOD FOR PRODUCING A CARBON HOLLOW FIBER MEMBRANE

RELATED APPLICATION

This application is a 35 U.S.C. § 371 national phase filing of International Patent Application No. PCT/JP2015/084851, filed Dec. 11, 2015, which claims priority under 35 U.S.C. § 119 to Japanese Patent Application No. 2014-252126, filed Dec. 12, 2014, the entire disclosure of which is hereby expressly incorporated by reference.

TECHNICAL FIELD

The present invention relates to a method for producing a hollow fiber carbon membrane. More particularly, the present invention relates to a method for producing a hollow fiber carbon membrane having excellent moldability, using a membrane-forming dope for carbon membranes, which comprises polyphenylene oxide as a main component.

BACKGROUND ART

Various organic membranes and inorganic membranes have conventionally been proposed as separation membranes. However, organic membranes have low solvent resistance and heat resistance, although they are inexpensive and excellent in moldability. As opposed to organic membranes, inorganic membranes, such as ceramic membranes, have excellent solvent resistance and heat resistance; however, they have problems of high cost and difficulty in molding.

Accordingly, carbon membranes, which are inorganic membranes, but have excellent moldability and are inexpensive, have recently attracted attention. Hollow fiber carbon membranes have pores of a size that allows gas separation, and exhibit excellent gas separation performance among various inorganic membranes. Further, hollow fiber carbon membranes can be used in an environment for which heat resistance against a temperature as high as about 70 to 150° C., at which organic membranes cannot be used, and chemical resistance are required. Accordingly, the practical use of hollow fiber carbon membranes is highly expected. Moreover, hollow fiber membranes have excellent pressure resistance, a large membrane area per unit volume, and capability of producing compact separation membrane modules.

Conventionally proposed hollow fiber carbon membranes are those produced, using as a raw material, for example, a resin obtained by sulfonating polyphenylene oxide (Patent Documents 1 and 2), and aromatic polyimide (Patent Document 3).

However, sulfonated polyphenylene oxide itself is not a versatile material, and therefore requires a synthesis process to sulfonate polyphenylene oxide. On the other hand, the synthesis of aromatic polyimide requires a reaction in an organic solvent; however, since it is difficult to ensure the solubility in the organic solvent, a special production method is necessary. Thus, carbon membranes produced using sulfonated polyphenylene oxide or aromatic polyimide as a raw material have problems of high membrane cost, because raw materials are expensive, and the preparation of raw materials and the membrane-forming process are complicated.

In contrast, a carbon membrane produced using inexpensive polyphenylene oxide as a raw material is also proposed (Patent Document 4). However, separation properties are low only with polyphenylene oxide; therefore, ensuring separation properties requires a complicated structure in which a sulfonated polyphenylene oxide resin is laminated on a polyphenylene oxide membrane, followed by calcination treatment, and the production process becomes complicated. Accordingly, there is a problem of high cost, despite the use of the inexpensive raw material.

In general, when any organic raw material is used, carbon membranes require spinning of hollow fibers, followed by two-step heating comprising, an "infusibilization treatment" in which heating is performed at 250 to 350° C. in the air, and a subsequent "carbonization treatment" in which heating is performed at 600 to 800° C. in an inert atmosphere or under vacuum.

Therefore, in order to produce carbon membrane hollow fiber membranes with excellent cost performance, there is a demand for a production method in which a hollow fiber is spun using inexpensive organic matter materials, and without adopting complicated processes, a two-step heating process comprising an infusibilization treatment step and a carbonization treatment step is performed as a main process. However, polyphenylene oxide, which is an inexpensive material, is a thermoplastic resin, and passes through about 220° C., which is the melting temperature of polyphenylene oxide, at the infusibilization step in which heating is performed at 250 to 350° C.; therefore, the hollow fiber shape formed by spinning is impaired due to the melting of the polyphenylene oxide, and crushing and breakage of the hollow fibers, fusion between the hollow fibers, etc., occur. Consequently, the target hollow fiber membrane in a strain-free hollow shape may not be obtained, and desired gas separation performance may not be obtained.

Thus, in conventionally known production methods, when polyphenylene oxide was used alone as a membrane material, and when a hollow fiber carbon membrane was produced through an infusibilization step and a carbonization step, it was difficult to obtain excellent moldability and desired gas separation performance in some cases.

PRIOR ART DOCUMENTS

Patent Documents

Patent Document 1: JP-A-2009-34614
Patent Document 2: JP-A-2013-94744
Patent Document 3: JP-A-2000-185212
Patent Document 4: JP-A-2013-63415
Patent Document 5: JP-A-7-51551

OUTLINE OF THE INVENTION

Problem to be Solved by the Invention

An object of the present invention is to provide a method for producing a hollow fiber carbon membrane having excellent moldability and gas separation performance using a membrane-forming dope for carbon membranes, which comprises polyphenylene oxide as a main component, without the need for complicated processes.

Means for Solving the Problem

The above object of the present invention can be achieved by preparing a membrane-forming dope for carbon membranes by dissolving polyphenylene oxide in an amount giving a concentration of 15 to 40 wt. % in the membrane-forming dope, and sulfur in an amount giving a ratio of 0.2 to 3.0 wt. % based on the polyphenylene oxide, in a solvent capable of dissolving these components; preparing the membrane-forming dope for carbon membranes into a hollow shape by means of a spinning method in accordance with a non-solvent induced separation method using a double annular nozzle; performing a crosslinking treatment at 200 to 240° C. in the air; then performing an infusibilization treatment by heating at 250 to 350° C.; and further performing a carbonization treatment by heating at 450 to 850° C. in an inert atmosphere or under vacuum.

Effect of the Invention

According to the method for producing a hollow fiber carbon membrane of the present invention, hollow fibers are prepared using a membrane-forming dope comprising polyphenylene oxide and then sulfur added at a ratio of 0.2 to 3.0 wt. % based on the polyphenylene oxide, and sulfur crosslinking is performed. This results in the excellent effects that the melting of the polyphenylene oxide can be avoided, the occurrence of crushing damage and breakage of the hollow fibers, fusion between the hollow fibers, etc., can be prevented, and the excellent moldability and high gas separation performance of the hollow fiber carbon membrane can be achieved.

BRIEF DESCRIPTION OF DRAWING

FIG. 1: A FIGURE showing the DTA measurement results of carbon membrane raw materials.

EMBODIMENTS FOR CARRYING OUT THE INVENTION

As the polyphenylene oxide, a commercial product, such as PPO646 (produced by SABIC), or PX100F or PX100L (produced by Mitsubishi Engineering-Plastics Corporation), can be used as they are. The polyphenylene oxide is used at a ratio of about 15 to 40 wt. %, preferably about 20 to 35 wt. %, in the membrane-forming dope. If the concentration of polyphenylene oxide is higher than this range, the membrane-forming dope becomes separated, and spinning cannot be performed. In contrast, if the concentration of polyphenylene oxide is lower than this range, the membrane becomes fragile during calcination, and an excellent carbon membrane cannot be obtained in some cases.

Sulfur is further added to the membrane-forming dope at a ratio of about 0.2 to 3.0 wt. %, preferably about 0.4 to 2.5 wt. %, based on the polyphenylene oxide. This ratio is determined so that crosslinking can be performed at a temperature lower than the melting temperature of polyphenylene oxide. If the ratio of sulfur is more than this range, the membrane-forming dope becomes separated, and spinning cannot be performed. In contrast, if the ratio of sulfur is less than this range, the effects obtained by the addition of sulfur, such as high gas separation performance, cannot be exhibited.

In the membrane-forming dope, a component having a crosslinking effect can also be used by adding in combination with sulfur. Examples of the component include organic peroxides, such as dialkyl-based peroxides (e.g., di(2-tert-butylperoxyisopropyl)benzene, dicumyl peroxide, 2,5-dimethyl-2,5-di(tert-butylperoxy)hexane, and 2,5-dimethyl-2,5-di(tert-butylperoxy)hexyne-3), diacyl-based peroxides (e.g., diisobutyryl peroxide), phenol resin crosslinking agents, quinone dioxime crosslinking agents, and the like.

The moldability of the hollow fiber carbon membrane can be ensured by incorporating a predetermined amount of sulfur into the membrane-forming dope, and performing sulfur crosslinking at a temperature equal to or lower than the melting temperature of polyphenylene oxide after spinning. This is because, as shown in the measurement results of DTA (differential thermal analysis; heating from room temperature to 300° C. at a constant heating rate) of polyphenylene oxide and sulfur-crosslinked polyphenylene oxide in FIG. 1, sulfur crosslinking of polyphenylene oxide starts at 226.1° C., which is lower than the endothermic peak (228.3° C.; downwardly projecting portion) of melting of polyphenylene oxide. Conversely, if sulfur crosslinking is not performed, the melting of the polyphenylene oxide, which is a spinning membrane material, is inevitable during heating from room temperature to the infusibilization temperature (i.e., 250 to 350° C.), and crushing and breakage of the hollow fibers, fusion between the hollow fibers, etc. occur, thereby failing to obtain excellent moldability and desired gas separation performance. Consequently, it becomes difficult to obtain a hollow fiber carbon membrane having target excellent moldability and high gas separation performance in some cases.

The preparation of the membrane-forming dope for carbon membranes is performed by dissolving polyphenylene oxide and sulfur (and an additive) in a solvent that can capable of dissolving these components. Dissolution is performed in such a manner that sulfur is first dissolved in a solvent, and polyphenylene oxide is then dissolved. Examples of the solvent include methanol, ethanol, tetrahydrofuran, N, N-dimethylacetamide, N-methyl-2-pyrrolidone, and the like; aprotic polar solvents, such as N, N-dimethylacetamide and N-methyl-2-pyrrolidone, are preferably used.

Here, if the spinning dope undergoes phase separation during spinning, stable spinning cannot be performed. Therefore, as the membrane-forming solution at the time of spinning and membrane formation, a phase-stable one with a phase-stable temperature, preferably one with an absolute value calculated by [the temperature during membrane formation–the temperature at which phase separation occurs] of 10° C. or above is used.

The prepared membrane-forming dope is extruded by a spinning method in accordance with a non-solvent induced phase separation method, such as a wet spinning method or a dry-wet spinning method, into a coagulation bath directly or through free running from the outer tube of a hollow fiber spinning nozzle having a double annular structure. If necessary, a core liquid that is immiscible with the polymer of the membrane-forming dope is simultaneously extruded from the inner tube of the spinning nozzle. Thus, a polyphenylene oxide hollow fiber membrane is formed. The core liquid and coagulation bath used herein are solvents (e.g., water, ethylene glycol, etc.) that are miscible with the solvent of the membrane-forming dope, but immiscible with the polyphenylene oxide. Moreover, the temperatures of the core liquid and the coagulation bath in this case are generally about −20 to 60° C., preferably about 0 to 30° C.

The obtained polymer hollow fiber membrane is washed with water, if necessary, and then dried; that is, the moisture content is removed from the polymer portion of the hollow fiber material. The conditions of drying are not particularly limited, as long as the polymer hollow fiber membrane is completely dried. Drying is generally performed at about 20 to 80° C., preferably about 25 to 60° C., for about 0.5 to 4 hours.

The dried hollow fiber material is subjected to a crosslinking treatment. The crosslinking treatment is performed at about 200 to 240° C., preferably about 220 to 230° C., for about 0.5 to 3 hours. If the crosslinking treatment is not performed, or if the crosslinking temperature is lower than this range, sulfur crosslinking does not proceed. In contrast, if the crosslinking temperature is higher than this range, the polyphenylene oxide is melted. Accordingly, desired moldability and high gas separation performance are not ensured in both cases.

The crosslinked polymer hollow fiber membrane is subjected to an infusibilization treatment prior to a carbonization treatment. The infusibilization treatment is performed by heating at about 250 to 350° C., which is lower than the carbonization temperature, for about 0.5 to 4 hours. Due to the infusibilization treatment, the performance as the hollow fiber carbon membrane is particularly improved.

The carbonization treatment is performed by heating a precursor polymer hollow fiber membrane by a known method wherein, for example, the precursor polymer hollow fiber membrane is contained in a container, and subjected to a heat treatment at a reduced pressure of $10^{-4}$ atm or less (about 10 Pa or less) or in an inert gas atmosphere replaced by helium gas, argon gas, nitrogen gas, or the like. The heating conditions vary depending on the type of material that constitutes the precursor polymer, the amount thereof, etc. In general, conditions of about 450 to 850° C., preferably about 600 to 800° C., and about 0.5 to 4 hours are applied at a reduced pressure of $10^{-4}$ atm or less (about 10 Pa or less) or in an inert gas atmosphere mentioned above.

In order to further improve the separation performance of the obtained hollow fiber carbon membrane, the surface thereof can be subjected to chemical vapor deposition (CVD), which is a known technique (see Patent Document 5, etc.), preferably a CVD treatment using hydrocarbon gas, such as propylene, butane, or cyclohexane. Due to the CVD treatment, a carbon membrane obtained by adding sulfur to the spinning dope characteristically achieves separation properties higher than those of a carbon membrane to which sulfur is not added.

EXAMPLES

The following describes the present invention with reference to Examples.

Example

A spinning dope comprising 28 parts by weight of polyphenylene oxide resin (PPO646, produced by SABIC), 0.6 parts by weight of sulfur (produced by Kanto Chemical Co., Inc.), and 71.4 parts by weight of dimethylacetamide was prepared by first dissolving the sulfur in the dimethylacetamide, and then dissolving the polyphenylene oxide resin.

The prepared spinning dope was heated to 150° C., and extruded into a water coagulation bath using a spinning nozzle having a double annular structure while using ethylene glycol as a core liquid, and dry-wet spinning was performed at a spinning rate of 15 m/min. Thereafter, the resultant was dried in an oven at 60° C., thereby obtaining a porous polyphenylene oxide hollow fiber membrane having an outer diameter of 1060 μm and an inner diameter of 930 μm.

Subsequently, the obtained hollow fiber membrane was inserted into a tube made of perfluoroalkoxyalkane resin (PFA: tetrafluoroethylene-perfluoroalkyl vinyl ether copolymer resin), and subjected to a crosslinking treatment by heating at a temperature of 230° C. for 1 hour in the air. Then, the hollow fiber membrane was similarly subjected to an infusibilization treatment by heating at a temperature of 300° C. for 1 hour in the air. Further, the infusibilized hollow fiber membrane was inserted into a quartz tube, and subjected to a carbonization treatment by heating at a temperature of 650° C. for 1 hour in a nitrogen atmosphere, thereby obtaining a hollow fiber carbon membrane having an outer diameter of 430 μm and an inner diameter of 370 μm. Further, a gas permeability test was conducted using the obtained carbon membrane.

Gas permeability test: One end of the carbon membrane was sealed by adhesion with an epoxy resin, and the other end was inserted into a piping part of a metal gasket gland (6LV-4-VCR-3S-6MTB7, produced by Swagelok) for 10 mm. The gap between the inserted part of the carbon membrane of up to 5 mm and the pipe of the gland was bonded with an epoxy resin, thereby producing a mini module for evaluating gas separation. The mini module was attached to a gas separation device, and different gases were flown on the outside of the carbon membrane at a pressure of 200 kPa g. The flow rate of the gas penetrating to the tube side was measured by a mass flow controller, and the obtained gas flow rate was divided by the membrane area, time, and pressure to calculate the gas permeability rate.

Comparative Example 1

In the Example, the crosslinking treatment was not performed, and the infusibilization treatment was performed at 290° C. for 1 hour. As a result, the obtained hollow fiber membrane had waviness, and was difficult to remove from the PFA tube.

Table below shows the results obtained in the above Example and Comparative Example 1.

TABLE

| Example | Gas permeability rate (mole/m$^2$ · sec · Pa) | | | | Separation factor |
|---|---|---|---|---|---|
| | He | $CO_2$ | $N_2$ | $CH_4$ | α (He/$CH_4$) |
| Example | $1.0 \times 10^{-8}$ | $3.0 \times 10^{-9}$ | $6.0 \times 10^{-11}$ | $1.3 \times 10^{-11}$ | 769 |
| Com. Ex. 1 | $8.3 \times 10^{-9}$ | $2.8 \times 10^{-9}$ | $8.2 \times 10^{-11}$ | $4.3 \times 10^{-11}$ | 193 |

Comparative Example 2

In the Example, a spinning dope comprising 28 parts by weight of polyphenylene oxide resin (PPO646) and 71.4 parts by weight of dimethylacetamide was used, without using sulfur. As a result, the hollow fibers were crushed due to melting after the infusibilization treatment, and breakage occurred, causing molding failure. Thus, the target hollow fiber carbon membrane could not be obtained.

The invention claimed is:

1. A method for producing a hollow fiber carbon membrane by preparing a membrane-forming dope for carbon membranes by dissolving polyphenylene oxide in an amount giving a concentration of 15 to 40 wt. % in the membrane-forming dope, and sulfur in an amount giving a ratio of 0.2 to 3.0 wt. % based on the polyphenylene oxide, in a solvent capable of dissolving these components; preparing the membrane-forming dope for carbon membranes into a hollow shape by means of a spinning method in accordance with a non-solvent induced separation method using a double annular nozzle; performing a crosslinking treatment at 200 to 240° C. in the air; then performing an infusibilization treatment by heating at 250 to 350° C.; and further performing a carbonization treatment by heating at 450 to 850° C. in an inert atmosphere or under vacuum.

2. The method for producing a hollow fiber carbon membrane according to claim 1, wherein after the carbonization treatment, the surface is further subjected to chemical vapor deposition using hydrocarbon gas.

3. A hollow fiber carbon membrane produced by the method for producing according to claim 1.

4. A hollow fiber carbon membrane produced by the method for producing according to claim 2.

* * * * *